J. E. BENNETT.
RUNNING GEAR FOR VEHICLES.
APPLICATION FILED MAY 9, 1912.
1,116,869.
Patented Nov. 10, 1914.
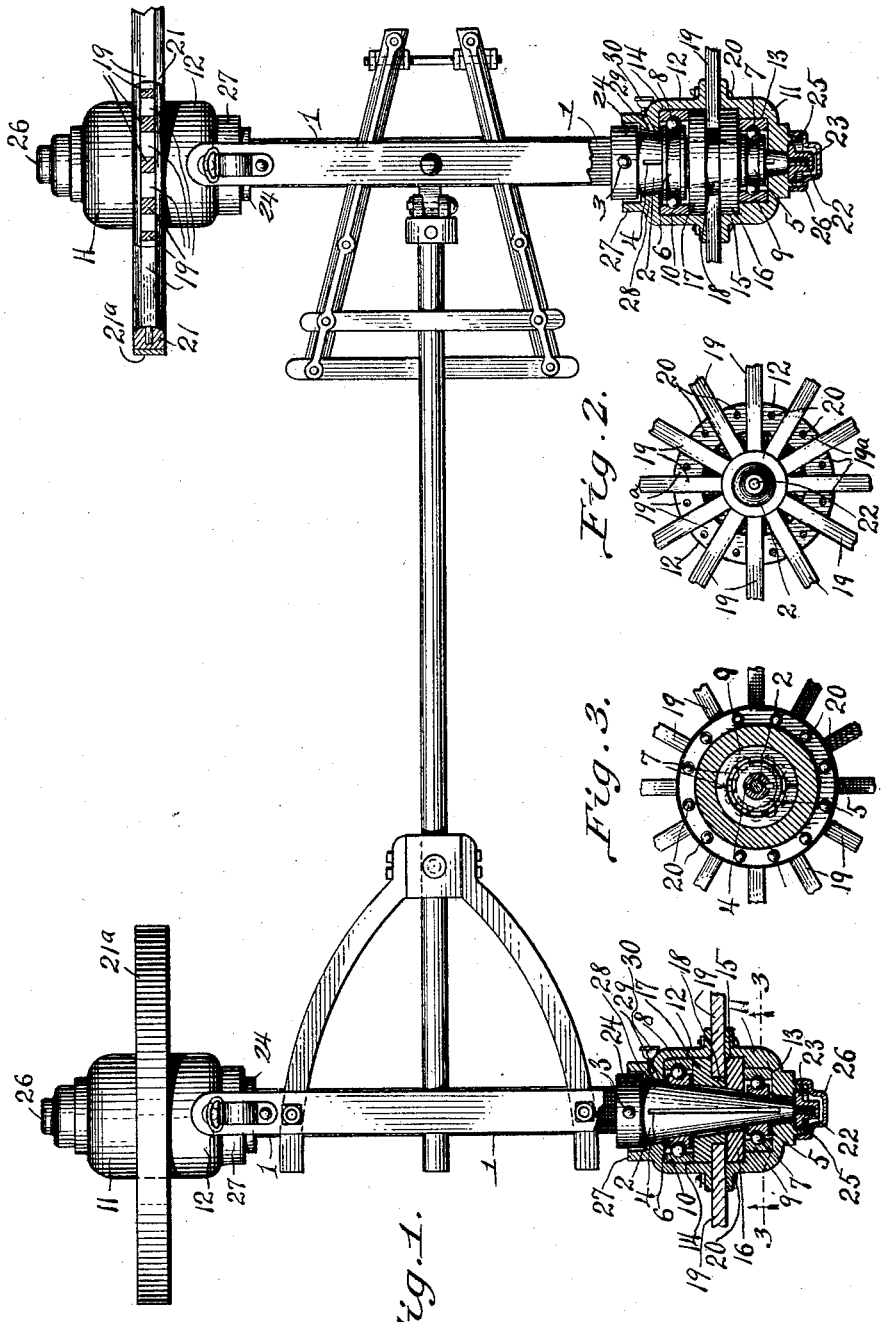
Witnesses:
Inventor:
James Edward Bennett,

UNITED STATES PATENT OFFICE.

JAMES EDWARD BENNETT, OF MOMENCE, ILLINOIS.

RUNNING-GEAR FOR VEHICLES.

1,116,869.   Specification of Letters Patent.   Patented Nov. 10, 1914.

Application filed May 9, 1912. Serial No. 696,261.

*To all whom it may concern:*

Be it known that I, JAMES E. BENNETT, a citizen of the United States of America, residing at Momence, in the county of Kankakee and State of Illinois, have invented certain new and useful Improvements in Running-Gear for Vehicles, of which the following is a specification.

The support generally used for wagons at the present time comprises an axle or axles with common skeins on each end, on which a thimble in a wooden hub is secured against loss, producing a bearing having a long neat fit, in which the grease dries often, and produces a stiff hard engagement with the other, moving, part.

My invention relates to an improvement in running gear for vehicles and has for its object to provide an easy running engagement between the wheel and the axle, and to construct the engaging parts so that each can be conveniently assembled and dissembled both with respect to itself and the other part.

In the drawings—Figure 1 is a plan view of a wagon running gear embodying my invention, parts being in section and parts being broken away to better the illustration. Fig. 2 is a side view of a bearing with the near parts removed, on the line 2—2 of Fig 1. Fig. 3 is a vertical section of a bearing on the line 3—3 of Fig. 1.

1 is an axle bar adapted to support suitable running gear and having tapered skeins 2 secured to each end by fastenings 3, the skein being provided with longitudinal oil grooves 4. Smaller peripherally-grooved rings 5 and larger peripherally-grooved rings 6 having an internal taper to correspond to the taper of the skeins, encircle the cone part of the skeins in spaced relation to each other and are secured to the skeins by splines or other suitable fastenings which will provide a rigid connection. The grooves of the rings 5 and 6 provide inner bearing surfaces or raceways for anti-friction balls 7 and 8, the balls being confined by outer two-part rings 9 and 10, having outer bearing surfaces or raceways and seated in cavities in outer and inner flanged hub sections 11 and 12, respectively. Each ball-bearing comprising a ring 5, balls 7, and two-part ring 9 is seated in a smaller cavity 13 in the outer hub section 11, and each ball-bearing comprising a ring 6, balls 8 and two-part ring 10 is seated in a larger cavity 14 in the inner hub section 12. A larger cavity or an enlarged portion 15 adjacent the cavity 13 receives a ball-bearing retaining disk or washer 16, and the space between the ball-bearing, comprising ring 5, balls 7 and two-part ring 9, and the mouth of the hub-section 12 filled by a ball-bearing retaining disk or washer 17 having a reduced part 18 adapted to serve as a butt for radially disposed spokes 19, of a wheel, the spokes being rigidly secured between the two flanged hub sections 11 and 12 and between intervening wedge-shaped blocks 19ª, the hub sections 11 and 12 and the intervening blocks 19ª being alined and secured rigidly together by fastenings 20. The inner ends of the spokes may be sharpened and the wedges omitted if desired. At their outer ends the spokes are received into suitable fellies 21 bound by suitable tires 21ª.

The ends of the tapered axle skeins carry a reduced screw threaded portion or an inserted screw pin 22, adapted to receive a retaining cap or nut 23. The skeins have an enlarged portion 24 where they are joined to the axle, and the hubs of the wheels are permitted to rotate between the cap 23 and the enlarged portion 24 which secure the wheels from side motion.

The outer hub section carries a reduced screw threaded extension 25 in each instance, the extension being adapted to receive thereon a dust cap 26, inclosing the pin 22 and cap 23. The inner hub section 12 has an inner extension 27 encircling the non-tapering enlarged portion 24 and serving in connection with the inwardly projecting circular flange 28 to exclude dust and mud from the inner end of the bearing, the flange 28 being the part to contact with the enlarged portion 24 of the axle in case of undue side play. The inner extension 27 and the flange 28 are perforated as at 29 to afford passage for lubricant to the bearing the outer end of the perforation 29 having a closure or an oil cap secured thereto, or therein.

It is obvious that by unscrewing the dust cap 26 and the cap 23, the wheel may be removed intact from the axle skein, the inner rings of the bearings sliding off the splines if the splines are in one piece with the axle skein or the inner rings of the bearings and their splines sliding off the skein where the rings and splines are made integral, the skein in the latter case being provided with suitable grooves to receive the integral splines on the inside of the rings 5, the splines preventing the turning of the rings on the axle skein thus transferring all motion to the balls in the grooves. By unbolting the fastenings 20 the wheel may be taken apart for the renewal of spokes or the examination of the bearings, and that all the parts are easy of access and may be examined without disturbing the ball-bearings.

The changes may be made in the general form and arrangement of the parts described without departing from my invention, and as fairly in view that falls within the spirit and scope of my invention.

Having thus described my invention the following is what I claim as new therein and desire to secure by Letters Patent:

A running gear comprising an inner hub section having an interior flange, a fixed inner ring, a loose outer ring surrounding the inner ring and a washer having a reduced part, all located in the cavity of the inner hub section, and outer hub section having a stepped cavity and an interior flange, a fixed inner ring, a loose outer ring surrounding the inner ring and a washer all located in the stepped cavity of the outer hub section, and spokes and intervening blocks bearing on the reduced part of the inner washer and clamped between the hub sections.

JAMES EDWARD BENNETT.

Witnesses:
E. P. HONEY,
ZOA COYLE.

---

Copies of this patent may be obtained for five cents each, by addressing the "Commissioner of Patents, Washington, D. C."